US011263106B2

United States Patent
Chen et al.

(10) Patent No.: US 11,263,106 B2
(45) Date of Patent: Mar. 1, 2022

(54) TRACE CONFIGURATION CALCULATING METHOD AND PORTABLE ELECTRONIC APPARATUS THEREOF

(71) Applicants: Inventec (Pudong) Technology Corp., Shanghai (CN); Inventec Corporation, Taipei (TW)

(72) Inventors: Cheng-Hsin Chen, Taipei (TW); Chun-Hung Lin, Taipei (TW); Chun-Chieh Chen, Taipei (TW)

(73) Assignees: Inventec (Pudong) Technology Corp., Shanghai (CN); Inventec Corporation, Taipei (TW)

( * ) Notice: Subject to any disclaimer, the term of this patent is extended or adjusted under 35 U.S.C. 154(b) by 195 days.

(21) Appl. No.: 16/817,647

(22) Filed: Mar. 13, 2020

(65) Prior Publication Data

US 2021/0279159 A1 Sep. 9, 2021

(30) Foreign Application Priority Data

Mar. 4, 2020 (CN) .......................... 202010144102.6

(51) Int. Cl.
 *G06F 1/16* (2006.01)
 *G06F 11/32* (2006.01)
(52) U.S. Cl.
 CPC .......... *G06F 11/323* (2013.01); *G06F 1/1681* (2013.01); *G06F 1/1683* (2013.01)
(58) Field of Classification Search
 USPC ........................................................ 16/358
 See application file for complete search history.

(56) References Cited

U.S. PATENT DOCUMENTS

| 4,555,633 | A | * | 11/1985 | Bjorkelund | G01V 8/20 250/559.15 |
| 5,037,589 | A | * | 8/1991 | Iwashita | D01F 9/00 264/29.2 |
| 5,425,157 | A | * | 6/1995 | Chang | E05D 11/082 16/381 |
| 6,519,812 | B2 | * | 2/2003 | Ko | H04N 5/2251 16/354 |
| 7,711,112 | B2 | * | 5/2010 | Satoh | G06F 1/1683 379/433.13 |
| 7,903,400 | B1 | * | 3/2011 | Chen | G06F 1/1624 361/679.27 |
| 8,186,016 | B2 | * | 5/2012 | Choi | G06F 1/1681 16/303 |
| 10,520,986 | B2 | * | 12/2019 | Hsu | G06F 1/1616 |
| 10,768,673 | B2 | * | 9/2020 | Hsu | G06F 1/1616 |

(Continued)

*Primary Examiner* — Lisa Lea-Edmonds
(74) *Attorney, Agent, or Firm* — Winston Hsu

(57) ABSTRACT

A trace configuration calculating method is applied to pivotal connection of a first workpiece and a hinge. A first trace space is formed at a position where the hinge is pivoted to the first workpiece. A first trace is disposed through the first trace space. The trace configuration calculating method includes the hinge and the first workpiece rotating first and second angles to make the first trace space have first and second contour cross-sections respectively, overlapping the first and second contour cross-sections to form a first intersection area, calculating a first maximum inscribed circle according to the first intersection area, and determining a first optimal center and a first maximum diameter of the first trace according to the first maximum inscribed circle.

7 Claims, 4 Drawing Sheets

(56) References Cited

U.S. PATENT DOCUMENTS

| | | | |
|---|---|---|---|
| 10,775,842 B1* | 9/2020 | Peng | F28D 15/0275 |
| 10,901,471 B2* | 1/2021 | Yang | F28D 15/043 |
| 2002/0013979 A1* | 2/2002 | Hayashi | H04M 1/0216 |
| | | | 16/330 |
| 2011/0047751 A1* | 3/2011 | Chen | G06F 1/1681 |
| | | | 16/303 |
| 2011/0078876 A1* | 4/2011 | Choi | G06F 1/1681 |
| | | | 16/297 |

* cited by examiner

TRACE CONFIGURATION CALCULATING METHOD AND PORTABLE ELECTRONIC APPARATUS THEREOF

BACKGROUND OF THE INVENTION

1. Field of the Invention

The present invention relates to a trace configuration calculating method and a portable electronic apparatus thereof, and more specifically, to a trace configuration calculating method for calculating an optimal configuration of a trace according to different contour cross-sections of a trace space in a hinge at different rotating angles and a portable electronic apparatus thereof.

2. Description of the Prior Art

In general, a conventional mechanical design of a portable electronic apparatus (e.g. a notebook) involves assembling a display screen with a computer host device by a hinge. Accordingly, a user just needs to rotate the display screen relative to the computer host device at a specific angle via the hinge, so as to operate the portable electronic apparatus conveniently. On the other hand, the user can rotate the display screen via the hinge to be folded on the computer host device for subsequent carrying or storage.

In practical application, for further reducing space occupied by a trace in the portable electronic apparatus, the prior art usually adopts the design that the trace is disposed through a trace space in the hinge. However, since the trace space has different contour cross-sections with rotation of the display screen and the computer host device via the hinge, the trace disposed through the trace space may be squeezed or even broken when the trace space becomes smaller with rotation of the hinge, so as to influence the service life and use reliability of the trace in the portable electronic apparatus.

SUMMARY OF THE INVENTION

The present invention provides a trace configuration calculating method applied to pivotal connection of a first workpiece and a hinge. A first trace space is formed at a position where the hinge is pivoted to the first workpiece. A first trace is disposed through the first trace space. The trace configuration calculating method includes the hinge and the first workpiece rotating a first angle to make the first trace space have a first contour cross-section, the hinge and the first workpiece rotating at least one second angle different from the first angle to make the first trace space have at least one second contour cross-section, overlapping the first contour cross-section with the at least one second contour cross-section to form a first intersection area, calculating at least one first maximum inscribed circle according to the first intersection area, and determining a first optimal center and a first maximum diameter of the first trace according to the at least one first maximum inscribed circle.

The present invention further provides a portable electronic apparatus including a computer host device, a hinge, and a first trace. The hinge is pivoted to the computer host device. A first trace space is formed at a position where the hinge is pivoted to the computer host device. The hinge and the computer host device rotate different angles to make the first trace space have different contour cross-sections for forming a first intersection area. The first trace is electrically connected to the computer host device and is disposed through the first trace space at a first optimal center with a first maximum diameter. The first optimal center and the first maximum diameter are determined according to at least one first maximum inscribed circle in the first intersection area.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
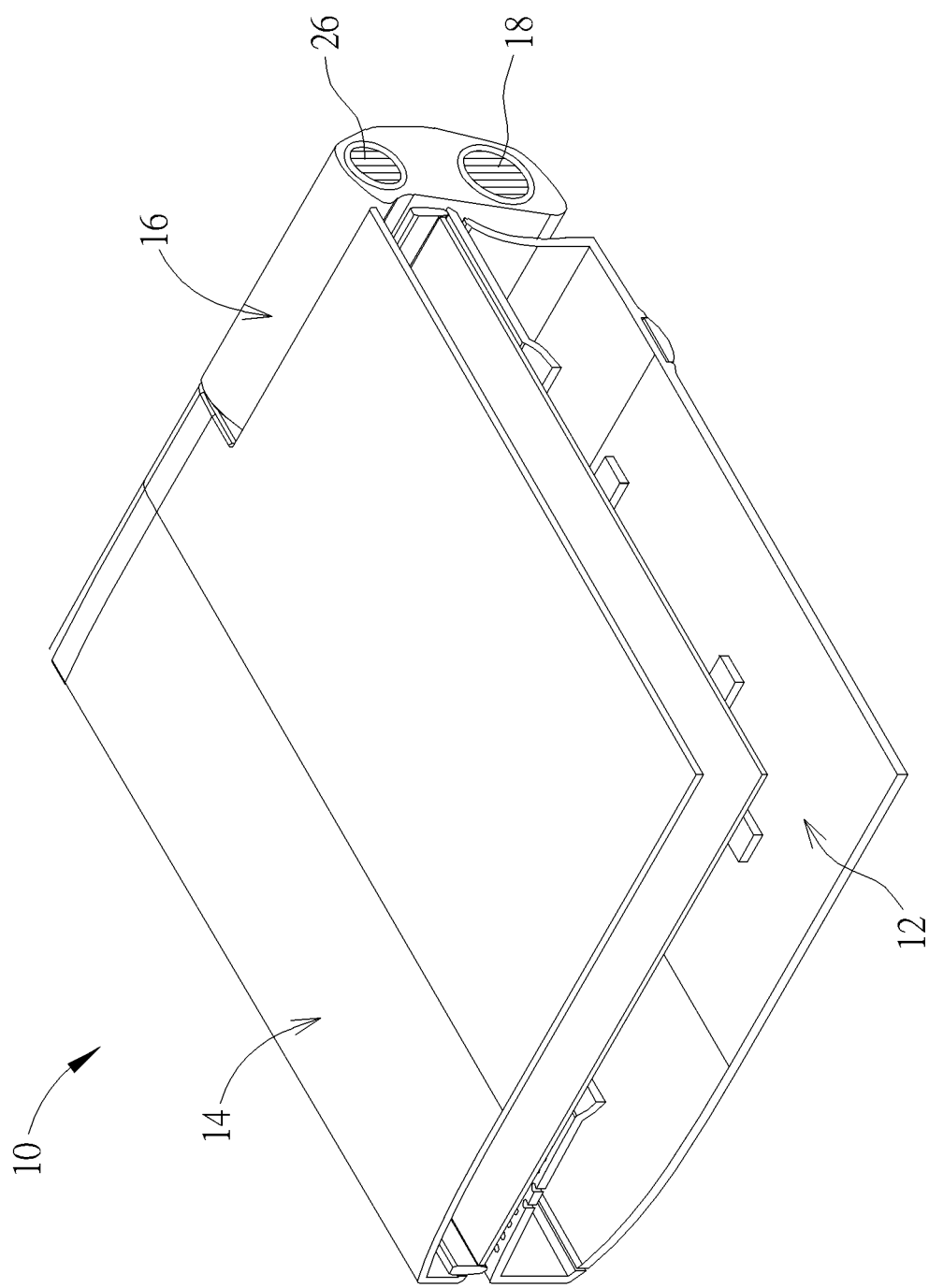
FIG. 1 is a partial cross-sectional diagram of a portable electronic apparatus according to an embodiment of the present invention.
Figure 2:
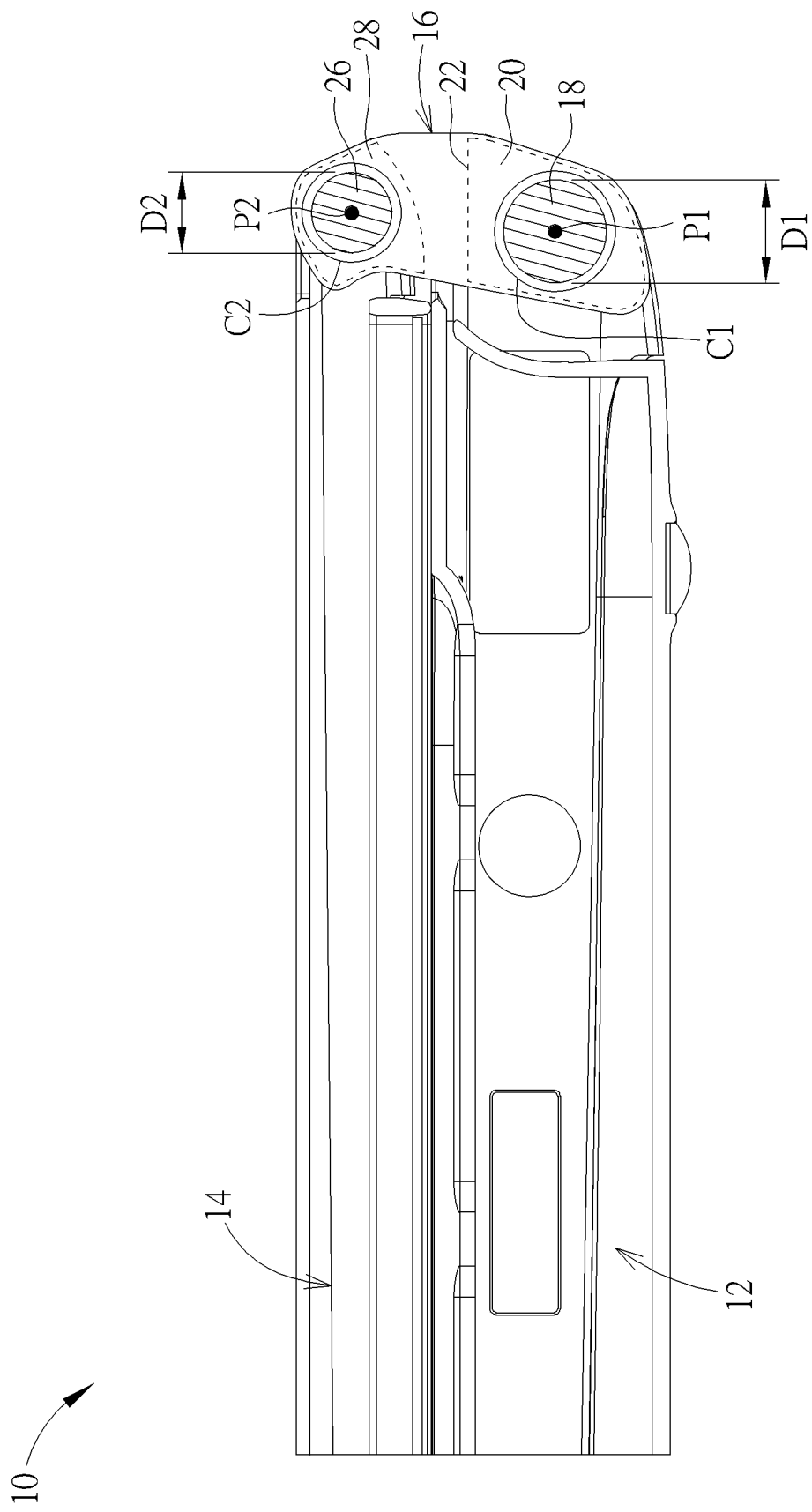
FIG. 2 is a side view of the portable electronic apparatus in FIG. 1.

Please refer to FIG. 1 and FIG. 2. FIG. 1 is a partial cross-sectional diagram of a portable electronic apparatus 10 according to an embodiment of the present invention. FIG. 2 is a side view of the portable electronic apparatus 10 in FIG. 1. As shown in FIG. 1 and FIG. 2, the portable electronic apparatus 10 could be preferably a notebook (but not limited thereto) and could include a computer host device 12 (could be regarded as a first workpiece of the present invention), a display screen 14 (could be regarded as a second workpiece of the present invention and could be selectively omitted for simplifying the mechanical design of the present invention), a hinge 16, and a first trace 18. The computer host device 12 and the display screen 14 are briefly depicted as simple frame structures in FIG. 1 and FIG. 2, and the related description is commonly seen in the prior art and omitted herein. In this embodiment, the computer host device 12 and the display screen 14 are pivoted to the hinge 16 respectively, so as to make the computer host device 12 and the display screen 14 rotatable to be expanded via the hinge 16 for a user to operate or rotatable to be folded up for subsequent storage or carrying.

Figure 3:
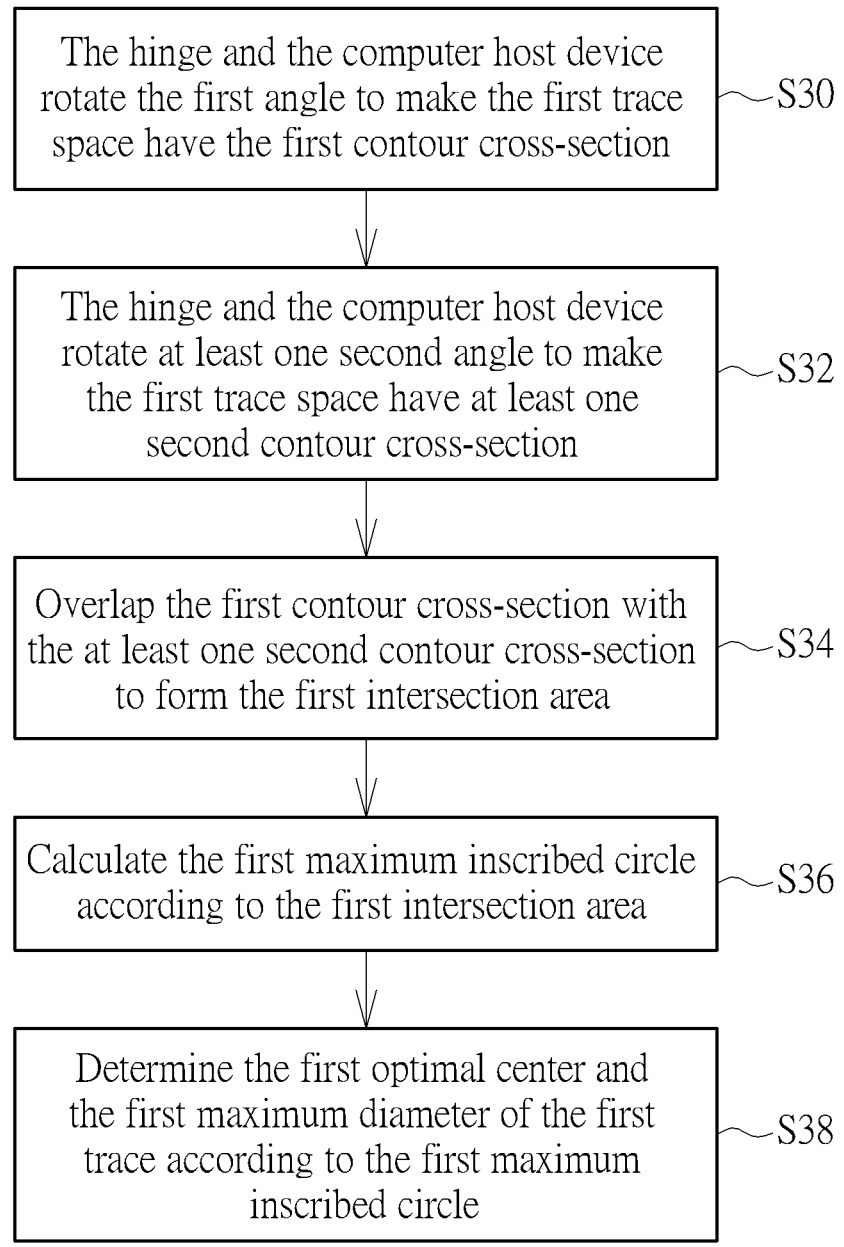
FIG. 3 is a flowchart of a trace configuration calculating method according to an embodiment of the present invention.

As shown in FIG. 2, a first trace space 20 is formed at a position where the computer host device 12 is pivoted to the hinge 16. The hinge 16 and the computer host device 12 can rotate different angles relatively to make the first trace space 20 have different contour cross-sections respectively. As such, the present invention can calculate an optimal configuration of a trace according to an intersection area formed by the different contour cross-sections. For example, please refer to FIG. 2 and FIG. 3. FIG. 3 is a flowchart of a trace configuration calculating method according to an embodiment of the present invention. As shown in FIG. 3, the trace configuration calculating method includes the following steps.

S30: the hinge 16 and the computer host device 12 rotate a first angle to make the first trace space 20 have a first contour cross-section 22;

S32: the hinge 16 and the computer host device 12 rotate at least one second angle different from the first angle to make the first trace space 20 have at least one second contour cross-section 23;

S34: overlap the first contour cross-section 22 with the second contour cross-section 23 to form a first intersection area 24;

S36: calculate at least one first maximum inscribed circle C1 according to the first intersection area 24;

S38: determine a first optimal center P1 and a first maximum diameter D1 of the first trace 18 according to the at least one first maximum inscribed circle C1.

Figure 4:
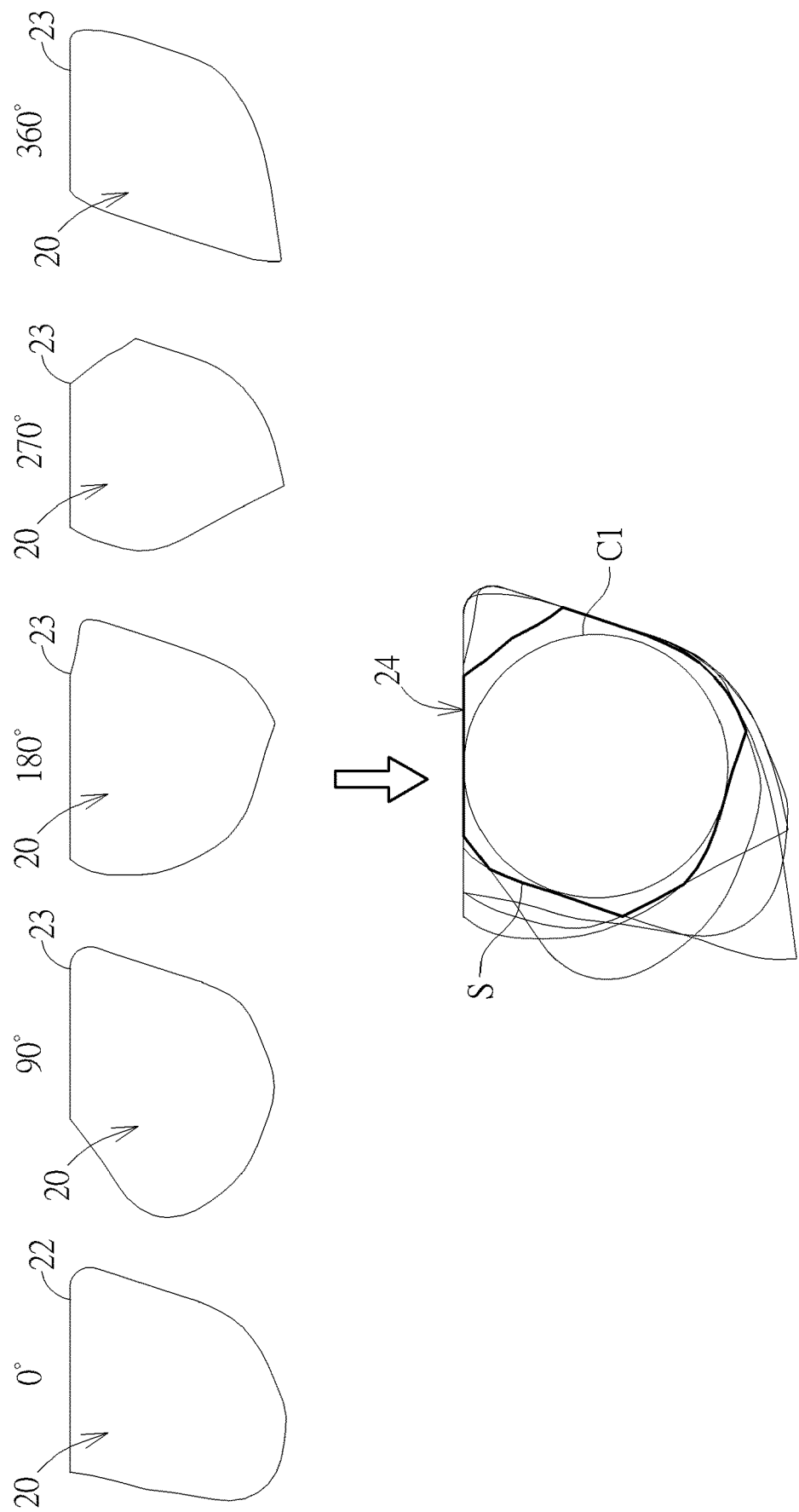
FIG. 4 is a diagram of a first trace space of a hinge in FIG. 2 having different contour cross-sections corresponding to different rotating angles.

More detailed description for the aforesaid steps is provided as follows on the condition that the first angle is 0° and the second angles are 90°, 180°, 270°, and 360° respectively (but not limited thereto, meaning that the present invention could adopt other angle variation design, such as increasing 30° or 60° each time). First, the hinge 16 and the computer host device 12 can rotate 0° (i.e. the first angle) relatively to make the first trace space 20 have the first contour cross-section 22 (Step S30), and then the hinge 16 and the computer host device 12 can rotate 90°, 180°, 270°, and 360 (i.e. the second angles) relatively to make the first trace space 20 have the corresponding second contour cross-sections 23 respectively as shown in FIG. 4 (Step S32). The first contour cross-section 22 is overlapped with the second contour cross-sections 23 to form the first intersection area 24 depicted by bold lines as shown in FIG. 4 (Step S34). Subsequently, as mentioned in Step S36, the at least one first maximum inscribed circle C1 (one shown in FIG. 4, but not limited thereto) can be calculated according to the first intersection area 24. To be more specific, in this embodiment, the present invention could preferably adopt the method of calculating an inscribed circle according to contour sides of an intersection area (but not limited thereto). In brief, as shown in FIG. 4, the first intersection area 24 has a plurality of contour sides S, so that a plurality of inscribed circles can be calculated by randomly selecting any three contour sides S from the plurality of contour sides S at multiple times. After the plurality of inscribed circles are calculated, comparison of the plurality of inscribed circles is performed to obtain the first maximum inscribed circle C1 having a maximum diameter from the plurality of inscribed circles. In such a manner, the present invention can determine the first optimal center P1 (preferably a circle center of the first maximum inscribed circle C1, but not limited thereto) and the first maximum diameter D1 (preferably a diameter of the first maximum inscribed circle C1, but not limited thereto) of the first trace 18 for accordingly disposing the first trace 18 through the first trace space 20 (as shown in FIG. 2). As for the related description for the trace fixing design for fixing the first trace 18 having the first maximum diameter D1 at the first optimal center P1, it is commonly seen in the prior art (e.g. the design that a hollow structure is formed in the hinge 16 to fixedly jacket the first trace 18) and omitted herein.

Via the aforesaid method for calculating the optimal configuration of the trace according to different contour cross-sections of the trace space in the hinge at different rotating angles, the trace disposed through the trace space in the hinge can be fixed at the optimal center in the trace space with the maximum diameter. In such a manner, regardless of the rotating angle of the hinge relative to the computer host device, the present invention can efficiently solve the prior art problem that the trace disposed through the trace space in the hinge is squeezed or even broken when the trace space becomes smaller with rotation of the hinge, so as to greatly improve the service life and use reliability of the trace in the portable electronic apparatus.

It should be mentioned that the aforesaid method is not limited to pivotal connection of the hinge and the computer host device. That is, the present invention is suitable for all the configurations that the trace is disposed through the trace space located in a position where the hinge is pivoted to a workpiece. For example, the trace configuration calculating method of the present invention can be applied to pivotal connection of the hinge 16 and the display screen 14. In brief, in this embodiment, as shown in FIG. 2, the portable electronic apparatus 10 could further include a second trace 26, and the computer host device 12 and the display screen 14 are pivoted to each other via the hinge 16 and are electrically connected to each other via the first trace 18 and the second trace 26. A second trace space 28 is formed at a position where the hinge 16 is pivoted to the display screen 14. The hinge 16 and the display screen 14 can rotate different angles relatively, to make the second trace space 28 have different contour cross-sections. As such, the present invention can calculate a second maximum inscribed circle C2 according to an intersection area formed by the different contour cross-sections of the second trace space 28, so as to determine a second optimal center P2 (preferably a circle center of the second maximum inscribed circle C2, but not limited thereto) and a second maximum diameter D2 (preferably a diameter of the second maximum inscribed circle C2, but not limited thereto) of the second trace 26 for accordingly disposing the second trace 26 through the second trace space 28 (as shown in FIG. 2). As for the other related description for this embodiment (e.g. the angle variation design, the design that the plurality of inscribed circles is calculated according to the contour sides of the intersection area, and so on), it could be reasoned by analogy according to the aforesaid embodiment and omitted herein.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A trace configuration calculating method applied to pivotal connection of a first workpiece and a hinge, a first trace space being formed at a position where the hinge is pivoted to the first workpiece, a first trace being disposed through the first trace space, the trace configuration calculating method comprising:
    the hinge and the first workpiece rotating a first angle to make the first trace space have a first contour cross-section;
    the hinge and the first workpiece rotating at least one second angle to make the first trace space have at least one second contour cross-section, the at least one second angle being different from the first angle;
    overlapping the first contour cross-section with the at least one second contour cross-section to form a first intersection area;
    calculating at least one first maximum inscribed circle according to the first intersection area; and
    determining a first optimal center and a first maximum diameter of the first trace according to the at least one first maximum inscribed circle.

2. The trace configuration calculating method of claim 1, wherein the hinge is pivoted to a second work piece, a second trace space is formed at a position where the hinge is pivoted to the second workpiece, a second trace is disposed through the second trace space, and the trace configuration calculating method further comprises:

the hinge and the second workpiece rotating different angles to make the second trace space have different contour cross-sections;

overlapping the different contour cross-sections to form a second intersection area;

calculating at least one second maximum inscribed circle according to the second intersection area; and determining a second optimal center and a second maximum diameter of the second trace according to the at least one second maximum inscribed circle.

3. The trace configuration calculating method of claim 2, wherein the first workpiece is a computer host device, the second workpiece is a display screen, and the first workpiece and the second workpiece are pivoted to each other via the hinge and are electrically connected to each other via the first trace and the second trace to form a portable electronic apparatus.

4. The trace configuration calculating method of claim 1, wherein the first intersection area has a plurality of contour sides, and the step of calculating at least one first maximum inscribed circle according to the first intersection area comprises:

calculating a plurality of inscribed circles respectively by randomly selecting at least three contour sides from the plurality of contour sides at multiple times; and comparing the plurality of inscribed circles to calculate the at least one first maximum inscribed circle.

5. A portable electronic apparatus comprising:

a computer host device;

a hinge pivoted to the computer host device, a first trace space being formed at a position where the hinge is pivoted to the computer host device, the hinge and the computer host device rotating different angles to make the first trace space have different contour cross-sections for forming a first intersection area; and a first trace electrically connected to the computer host device and disposed through the first trace space at a first optimal center with a first maximum diameter;

wherein the first optimal center and the first maximum diameter are determined according to at least one first maximum inscribed circle in the first intersection area.

6. The portable electronic apparatus of claim 5, wherein the portable electronic apparatus further comprises a display screen and a second trace, the display screen is pivoted to the hinge, the display screen and the computer host device are electrically connected to each other via the first trace and the second trace, a second trace space is formed at a position where the hinge is pivoted to the display screen, the hinge and the display screen rotate different angles to make the second trace space have different contour cross-sections for forming a second intersection area, the second trace is disposed through the second trace space at a second optimal center with a second maximum diameter, and the second optimal center and the second maximum diameter are determined according to at least one second maximum inscribed circle in the second intersection area.

7. The portable electronic apparatus of claim 6, wherein the first intersection area has a plurality of contour sides, a plurality of inscribed circles is calculated respectively by randomly selecting at least three contour sides from the plurality of contour sides at multiple times, and the at least one first maximum inscribed circle is calculated by comparing the plurality of inscribed circles.

* * * * *